US011850929B2

United States Patent
Barillot et al.

(10) Patent No.: US 11,850,929 B2
(45) Date of Patent: Dec. 26, 2023

(54) VEHICLE AXLE, IN PARTICULAR A MOTORIZED AXLE, ON WHICH SEVERAL ELECTRIC MOTORS ARE MOUNTED

(71) Applicant: VOLVO TRUCK CORPORATION, Gothenburg (SE)

(72) Inventors: Thomas Barillot, Mornant (FR); Bertrand Cauvin, Reyrieux (FR); Jean Terrat, Malleval (FR); Serge Vananty, Chassieu (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/755,178

(22) PCT Filed: Oct. 24, 2019

(86) PCT No.: PCT/EP2019/079070
§ 371 (c)(1),
(2) Date: Apr. 22, 2022

(87) PCT Pub. No.: WO2021/078388
PCT Pub. Date: Apr. 29, 2021

(65) Prior Publication Data
US 2022/0396136 A1    Dec. 15, 2022

(51) Int. Cl.
*B60K 1/02* (2006.01)
*F16H 61/04* (2006.01)
*B60K 17/356* (2006.01)

(52) U.S. Cl.
CPC .......... *B60K 1/02* (2013.01); *F16H 61/0403* (2013.01); *B60K 17/356* (2013.01); *F16H 2061/0433* (2013.01); *F16H 2200/0034* (2013.01)

(58) Field of Classification Search
CPC ..... B60K 1/02; B60K 17/356; F16H 61/0403; F16H 2061/0433; F16H 2200/0034; B60Y 2200/91
See application file for complete search history.

(56) References Cited

U.S. PATENT DOCUMENTS 5,289,890 A     3/1994  Toyoda et al.
9,623,872 B2 *  4/2017  Zhu ..................... F16H 61/0403
(Continued)

FOREIGN PATENT DOCUMENTS

| CN | 105142966 A | * | 12/2015 | ............... B60K 1/02 |
| CN | 206528311 U | * | 9/2017 | |
| GB | 2451246 A | | 1/2009 | |

OTHER PUBLICATIONS

International Search Report and Written Opinion in corresponding International Application No. PCT/EP2019/079070 dated May 29, 2020 (10 pages).

*Primary Examiner* — Justin Holmes
(74) *Attorney, Agent, or Firm* — Venable LLP; Jeffri A. Kaminski

(57) ABSTRACT

The invention relates to a vehicle axle, comprising: —a differential; —a powertrain, comprising a first electric motor (EM1) and a second electric motor (EM2); —a first transmission element between the first electric motor and said differential, this first transmission element comprising a variable transmission ratio; —a second transmission element between the second electric motor and said differential; wherein the second electric motor is controlled so as to provide its maximum power during gear changes of the first transmission element, so as to compensate at least partially for the power loss inherent in the gear change.

13 Claims, 4 Drawing Sheets

(56) References Cited

U.S. PATENT DOCUMENTS

| | | | |
|---|---|---|---|
| 9,789,754 B2* | 10/2017 | Zhu | B60W 20/00 |
| 2004/0166980 A1* | 8/2004 | Supina | B60W 30/18027 |
| | | | 903/910 |
| 2010/0087287 A1 | 4/2010 | Tabata et al. | |
| 2011/0098151 A1 | 4/2011 | Ziemer | |
| 2011/0168469 A1 | 7/2011 | Hansson | |
| 2014/0332301 A1 | 11/2014 | Knoblauch et al. | |

* cited by examiner

VEHICLE AXLE, IN PARTICULAR A MOTORIZED AXLE, ON WHICH SEVERAL ELECTRIC MOTORS ARE MOUNTED

CROSS-REFERENCE TO RELATED APPLICATIONS

This application is a U.S. National Stage application of PCT/EP2019/079070, filed Oct. 24, 2019 and published on Apr. 29, 2021, as WO/2021/078388, all of which is hereby incorporated by reference in its entirety.

TECHNICAL FIELD

The invention concerns a vehicle axle, in particular a motorized axle, on which several electric motors are mounted. This type of axle is intended for "full-electric" vehicles, i.e. vehicles operating with electricity as the only source of energy.

The invention can be applied in heavy-duty vehicles, such as trucks, buses and construction equipment. Although the invention will be described with respect to a truck, the invention is not restricted to this particular vehicle, but may also be used in other vehicles such as passenger cars, buses and construction equipment.

BACKGROUND

In the field of vehicle axles, U.S. Pat. No. 5,289,890 discloses a drive train for an electric motor vehicle, in which first and second motors are disposed in parallel with each other in a forward portion of the vehicle. The first and second motors drive a common motor shaft, which rotates a counter drive gear. The counter drive gear engages a counter driven gear, which, in turn, engages a ring gear, so that rotation in the same direction as that of the motor shaft is transmitted at a reduced rotational speed to the ring gear. The ring gear is coupled to a differential unit, through which the rotation of the ring gear is transmitted to left and right drive shafts, driving the front wheels of the vehicle.

However, the two electric motors share the same gearbox.

US 2014/0332301 A1 discloses a power train comparable to the one disclosed in the publication above. There is however an additional clutch which enables to switch off one of the electric motors. In this disclosure, the two electric motors also share a common gearbox. Further, the gearbox ratio is not controllable.

GB 2 451 246 A discloses a powertrain system comprising two electric motors, provided each with their own gearbox. Also, both electrical motors engage with the crown wheel of the vehicle differential. However, this publication does not tackle the problem of torque loss during gear shift (powershift).

US 2011/0098151 A1 discloses a hybrid drive train comprising an internal combustion engine mounted transversely at the front, two electric machines and a transmission with a plurality of gears. The internal combustion engine is connected, via a torsion damper, to the first electric machine, which is connected rotationally fixed to the transmission input shaft of the transmission. According to the invention, the second electric machine is connected, via a spur gear arrangement, to the transmission output shaft of the transmission. The transmission output shaft of the transmission is connected by a spur gear arrangement to a differential for distributing the drive torque to the two front wheels of the motor vehicle. It can also be provided that the first and/or the second electric machine can be disengaged by means of a shift element, preferably by a claw clutch, whereby drag torques are further reduced.

US 2011/0168469A1 discloses a vehicle provided with a first propulsion source, a second propulsion source and an interface device. The first propulsion source is connected to at least one wheel via a clutch and it intended for providing a first torque to the wheel. The clutch is intended to selectively remove the first torque from the wheel during the time of a gear change by disengaging the first propulsion source from at least one wheel. The second propulsion source is connected to the wheel. The interface device is used for controlling a provision of a second torque from the second propulsion source to at least one wheel during the gear change.

Even though this publication discloses the basic principle of torque fill in during a gear change, it does not concern a powertrain system comprising two electric motors: It relates to an ICE assisted by an electric motor.

SUMMARY

An object of the invention is to provide an electric axle, in particular for a full-electric vehicle, in which the gearshift does not provoke any torque loss. The main challenge here was to design an axle that would be provided with at least two electric motors to have a torque fill in during gearshifts, without that reducing the compactness of the axle. In the end, the idea is to improve driving comfort by masking the gearshifts.

The object is achieved by a vehicle axle according to claim 1.

By the provision of a vehicle axle which comprises two electric motors, the advantage is that one of the electric motors can be controlled so as to provide an additional power during gear changes, so as to fully compensate for the power loss inherent in the gear change.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
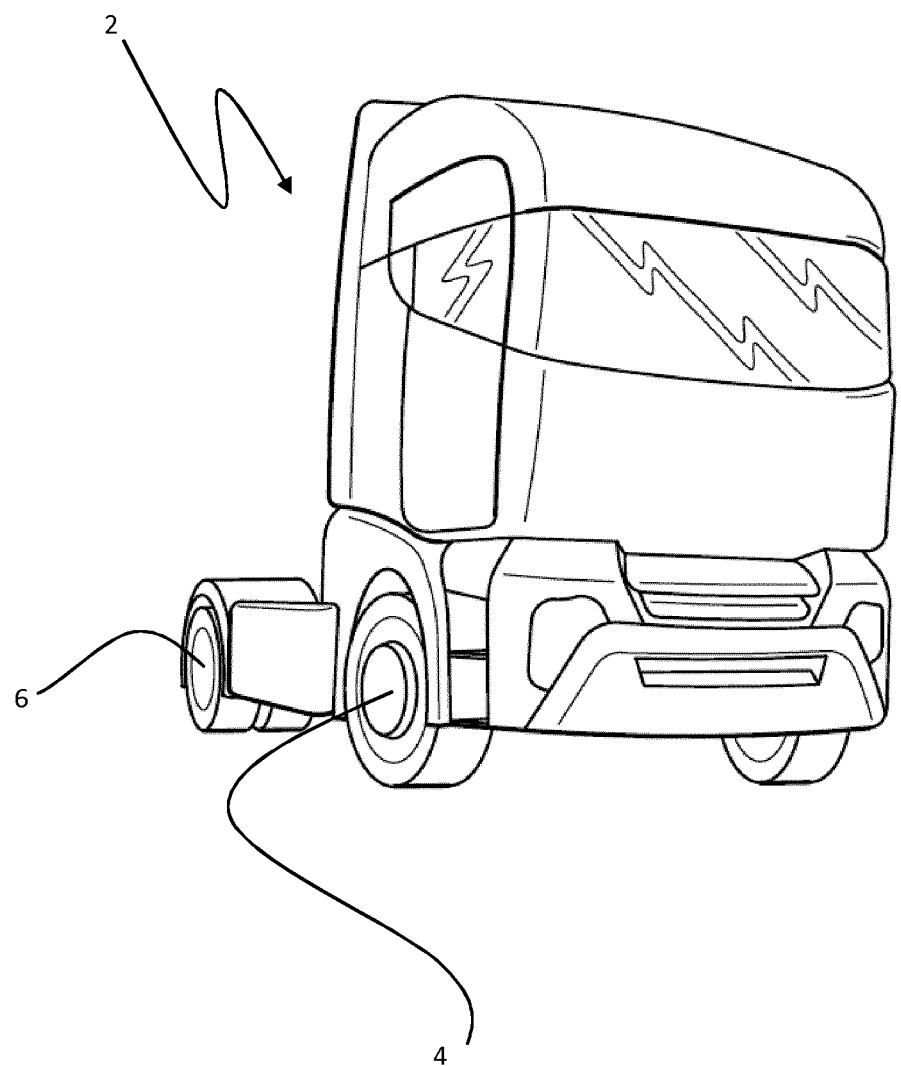
FIG. 1 is a perspective view of a truck comprising at least one axle according to the invention.

FIG. 1 shows a truck 2, comprising two axles 4 and 6, respectively a front axle 4 and a rear axle 6.

Obviously, in an alternative embodiment, the vehicle may include one or more additional rear axle(s).

At least one of the two axles 4 and 6 is motorized, i.e. includes at least one electric motor. In the example, we consider that only the front axle 4 is motorized, i.e. vehicle 2 is a traction vehicle (in which only the front axle(s) is/are motorized). However, the invention obviously also applies to all-wheel drive vehicles and to propulsion vehicles (in which only the rear axle(s) is/are motorized).

Axle 4 includes a powertrain, comprising a first electric motor EM1 and a second electric motor EM2. In the example, the two motors EM1 and EM2 are identical, i.e. they have the same characteristics (supply voltage, operating current, torque-speed characteristic, etc.).

Advantageously, the electric motors EM1 and EM2 are AC type motors (synchronous or asynchronous). Alternatively, the electric motors EM1 and EM2 could be DC type motors as well (brushed). More generally, any electric motor is suitable.

Preferably, the axle 4 has an elongated axle body (a.k.a "axle housing"). This axle housing is hollow. It includes a central part inside which a differential (not shown) is received and two lateral parts extending on either side of the central part. The two lateral parts receive the two output shafts connected to the wheels W1 and W2. Such axle housing is known as such, that is why it is not shown on the figures.

Typically, the motors EM1 and EM2 are attached to the axle housing by any appropriate means and in particular by bolting. Such fastening means are known as such, that is why they are not shown on the figures. Alternatively, the housing of the electric motors EM1 and EM2 is integral with the axle housing: Both housings are a single one piece.

Advantageously, the first electric motor EM1 and the second electric motor EM2 are offset from a longitudinal axis X4 of the axle 4.

Preferably, the axis of rotation of each electric motor EM1 and EM2 is parallel to the longitudinal axis X4 of axle 4.

A first transmission element 8 is provided between the first electric motor EM1 and the differential, this first transmission element 8 including a variable transmission ratio. In the example, this first transmission element 8 is a gearbox, with a gear reduction mechanism.

The first transmission element 8 includes a pinion 10 at the end of the output shaft of the motor EM1. This pinion 10 meshes with another pinion 12 of larger diameter. Pinion 12 is mounted at the end of a shaft 14 connected in parallel (countershaft) and comprising, at the opposite end, another pinion 16 of smaller diameter. This other pinion 16 meshes with a pinion 18 of larger diameter. Pinion 18 is mounted at the end of a shaft 20 along which are arranged a first pinion 22 and a second pinion 24 (at the end of shaft 20).

A dog clutch mechanism enables the rotation of the shaft 20 to be transmitted either to pinion 22 or pinion 24. This mechanism includes a ring 26 rotationally coupled with the shaft 20. Also, ring 26 is movable in translation along shaft 20 between a first position, shown in FIG. 2, in which it is rotationally connected with pinion 22 and a second position, shown in FIGS. 3 and 4, in which it is rotationally connected with pinion 24.

Pinion 24 meshes directly on the crown wheel 30 of the differential, while pinion 22 meshes with pinion 32 at the end of a secondary shaft (or in parallel). This secondary shaft has at the other end a pinion 34 in engagement with pinion 24 and thus forms an additional reduction stage.

In the example, the first transmission element 8 therefore has two transmission ratios (two-speed gearbox). However, it is obvious that, in the variant not shown, gearbox 8 could have a number of gears strictly greater than two.

Figure 2:
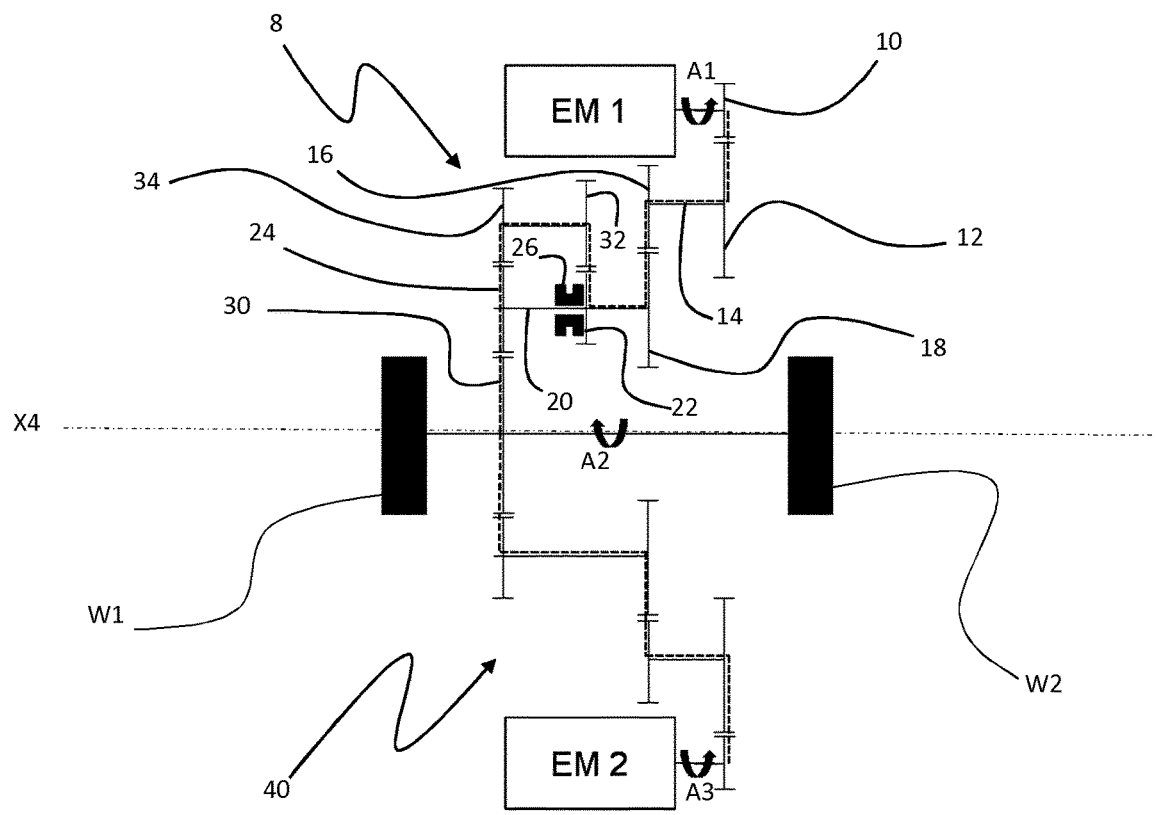
FIG. 2 to 4 are schematic views of the axle according to the invention, in three different configurations of operation.

In the configuration of FIG. 2, the transmission ratio (a.k.a "speed ratio" or "gear ratio") of transmission element 8 is relatively important, as it is adapted to a rather low vehicle speed. This transmission ratio is precisely the one chosen when the vehicle starts to move or moves at low speed.

Figure 4:
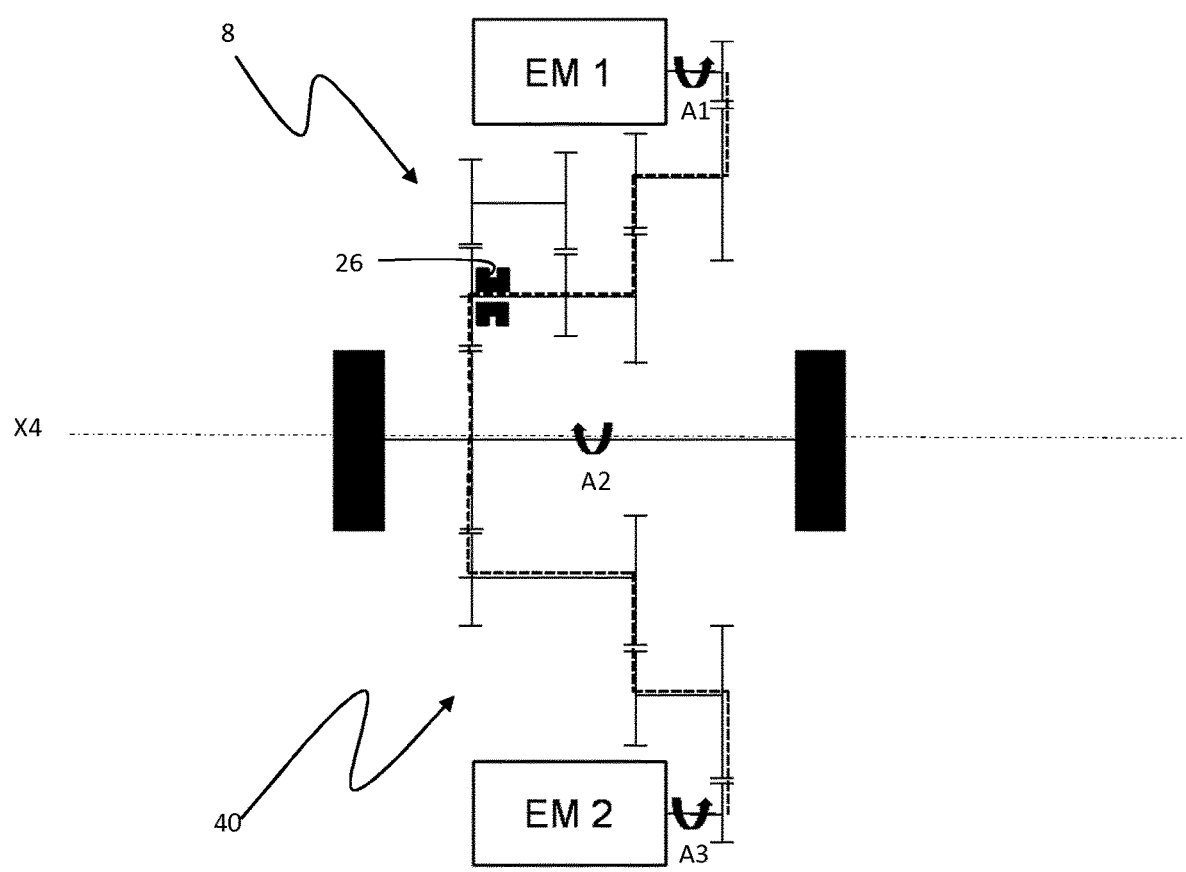

In contrast, in the configuration of FIG. 4, the transmission ratio of the transmission element 8 is lower, as it is adapted to a higher vehicle speed. This transmission ratio is precisely the one chosen under driving conditions.

A second transmission element 40 is provided between the second electric motor EM2 and the differential.

It is therefore understood that the two electric motors EM1 and EM2 are in engagement with the same differential, i.e. the two torques respectively provided by the two motors are both transmitted to the crown 30 of the differential. In a way known per se, the differential distributes the movement transmitted by the two motors EM1 and EM2 to the output shafts linked to the wheel hubs, in proportion to the resistance torques encountered.

Preferably, the electric motors EM1 and EM2 and the associated transmission elements 8 and 40 are encased inside the axle housing. Alternatively, they could be outside of the axle housing: In this case, the housing would include standard interfaces to assemble the electric motors.

In the example, this second transmission element 40 has a fixed transmission ratio. On the other hand, one could, as a variant, imagine that the second transmission element 40 would also be provided in the form of a gearbox, with several transmission ratios (like the first transmission element 8).

Advantageously, the second transmission element 40 is also a gearbox, but one could, as an alternative, imagine any other type of transmission element, such as a pulley-belt system, a chain transmission system, etc. This also applies to the first transmission element 8.

Preferably, the axle also includes an electrical power source, such as a battery or any other type of power source, for instance fuel cells (not shown), to provide electrical power to both electric motors EM1 and EM2.

When starting, the axle is in the configuration shown in FIG. 2. In this configuration, the two motors EM1 and EM2 rotate (See arrows A1 and A3 on FIG. 2) and transmit a torque to the differential (See arrow A2), which is the sum of the two torques transmitted, on one hand, by motor EM1 and, on the other hand, by motor EM2. Gearbox 8 operates in its first gear ratio.

When the vehicle accelerates (i.e. in the configuration of FIG. 3), gearbox 8 automatically changes gears of ratio: Ring 26 is therefore moved from its first position to its second position. In other words, the transmission ratio of the first transmission element 8 is automatically modified according to the vehicle speed (gearbox 8 is not a manual gearbox).

Figure 3:
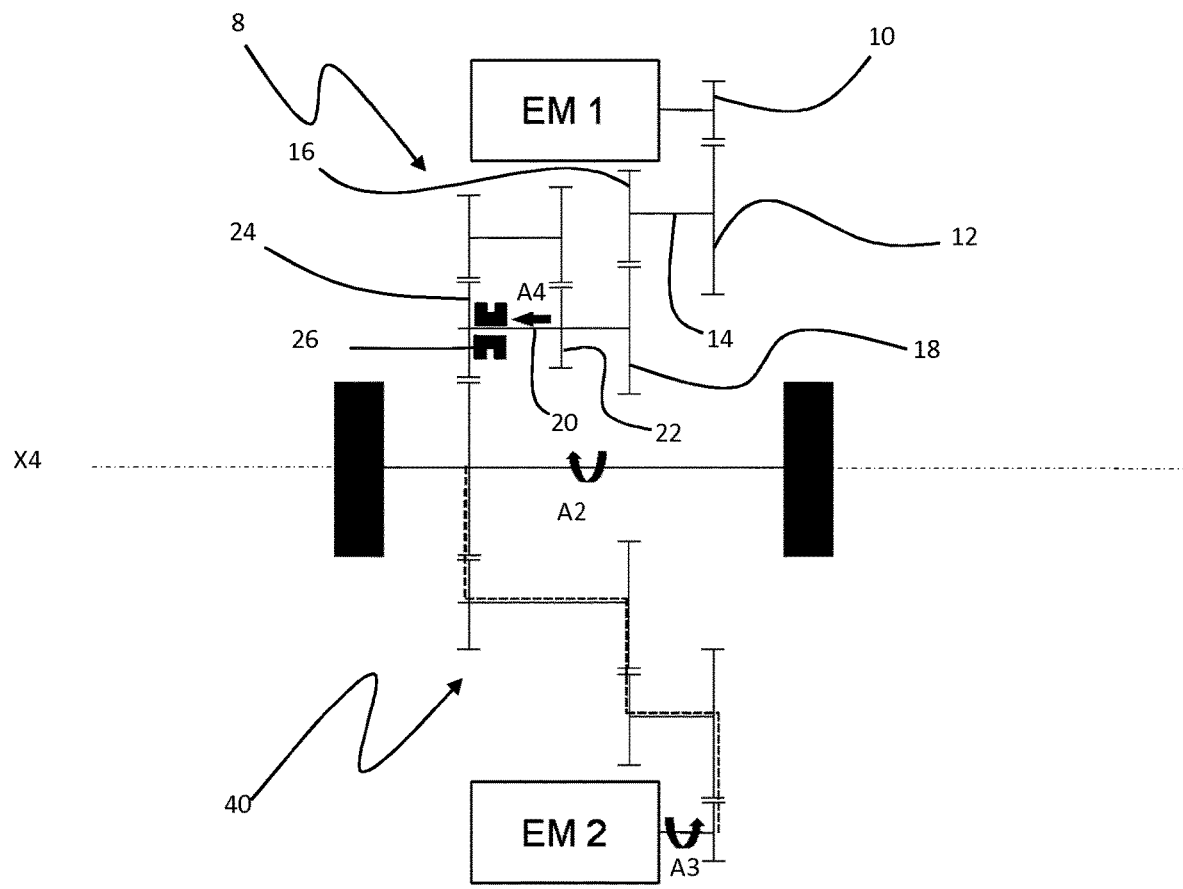

During this gear change, the second electric motor EM2 is controlled to provide an additional power, so as to fully compensate for the power loss inherent in the gear change (Indeed, and as shown in FIG. 3, during a gear change, the motor EM1 does not transmit any torque to the differential). This means that during a gear change, the second electric motor EM2 is controlled to provide more power than before the gear change.

Advantageously, said additional power is approximately equal to the power that was provided (or delivered) by the first electric motor EM1 just before the gear change, meaning that the gear change does not create any discontinuity point (The power curve delivered by the axle powertrain remains smooth) and the driver does not even feel the gear change. In other words, if gear change occurs at time t1, said additional power is approximately equal to the power delivered by the motor EM1 at time $t1-\Delta t$. We speak of an "additional power" since it is added to the power already delivered by motor EM2 before gear change (at time $t1-\Delta t$). The value of $\Delta t$ depends on the precision of the calculators.

In practice, the second electric motor EM2 is controlled so as to provide an over-torque during gear changes of the first transmission element 8, said over-torque being approximately equal to the torque that was provided by the first electric motor EM1 just before the gear change.

The torque that was supplied by the first electric motor EM1 "just before the gear change" is then the torque which is considered here for the torque compensation (or torque fill-in). On the curve that would show the evolution of the torque with respect to the time, it corresponds to the last point before the torque drops to zero or almost zero due to the unclutching. In other words, it is the motor torque a few moments, for example a few milliseconds, before the clutch is disengaged.

The electric current supplied to the second electric motor EM2 is increased during gear changes so as to provide said over-torque during gear changes of the first transmission element 8. In general, it is known that the torque provided by an electric motor is proportional to the value of the electric current absorbed by the electric motor.

Besides, and given that gear changes occurs generally when the vehicle is accelerating, the voltage supplied to the second electric motor EM2 is also increased during gear changes so as to keep accelerating the vehicle.

In practice, an ECU (not shown) is therefore provided for controlling the value of the electric current and/or the voltage supplied to the second electric motor EM2.

The same ECU (or another independent ECU) is provided for controlling the first electric motor EM1. This means that the parameters of motors EM1 and EM2, such as the speed, the torque, the absorbed electric current and the voltage are fixed by the ECU(s), depending on the driver request (on the throttle), road conditions (slope, etc.) and load conditions of the vehicle (weight).

In general, an electric motor has what is called a "nominal power", which is the power it is capable of delivering over a long period of time and a "maximum power" (a.k.a "peak power"), which is the power not to be exceeded. Generally, the maximum power is used over a very short period of time only, in the order of a few seconds, in order to avoid excessive overheating and damage the motor components.

It is generally not recommended to exceed the nominal power. In our application, it is only exceeded, where the torque requirement is high and now during gear changes to compensate for the power loss. In other words, in normal driving conditions, the respective powers delivered by motors EM1 and EM2 remain below or equal to the corresponding nominal power.

In practice, the electric motors EM1 and EM2 are not used at their nominal power over the entire operating range of the vehicle. This means that during gear changes of the first transmission element 8, the power supplied by the second electric motor EM2 is not always equal to its maximum power. It is generally between the nominal power and the maximum power. The maximum power is only reached under quite specific driving conditions, for example when the vehicle is very loaded or when driving on a slope.

In addition, during gear changes, the first electric motor EM1 is not completely stopped and continues to run idle (without load). The ECU that controls the electric motor EM1 also performs a speed synchronization whose purpose is to synchronize the speed of pinion 24 or 22 with that of the shaft 20 so that the dog clutch mechanism can be engaged again. In a variant not shown, the dog clutch mechanism includes a synchronizer mechanism or synchromesh to achieve the synchronization of speed.

After gear change is complete, motor EM1 starts delivering a certain power again and the power delivered by motor EM1 decreases. Precisely, if gear change completes at time t2, the power delivered by motor EM1 drops to a certain power, which is equal to the power delivered by motor EM2 at time t2−Δt minus the power delivered by motor EM1 at time t2.

It is to be understood that motors EM1 and EM2 are controlled to avoid any discontinuity point (The power curve delivered by the axle powertrain, i.e. by motors EM1 and EM1, remains smooth).

Also, in the example, the two transmission elements 8 and 40 have different transmission ratios. This means that the two transmission ratios of gearbox 8 are each different from the transmission ratio of gearbox 40. The corresponding advantage is that the powertrain (comprising the two motors EM1, EM2 and the transmission elements 8 and 40) offers a wide range of speed and/or torque.

Specifically, the second transmission element 40 has a transmission ratio that is higher than the first transmission ratio and lower than the second transmission ratio of the first transmission element 8.

In the example, the vehicle 2 has only one powertrain. Alternatively, in the case where the vehicle would have several powertrains, each powertrain in the vehicle would preferably be of the electric type, i.e. the vehicle is preferably "full-electric".

It is to be understood that the present invention is not limited to the embodiments described above and illustrated in the drawings; rather, the skilled person will recognize that many changes and modifications may be made within the scope of the appended claims.

The invention claimed is:

1. Vehicle axle, comprising:
   a differential;
   a powertrain, comprising a first electric motor and a second electric motor;
   a first transmission element between the first electric motor and said differential, this first transmission element comprising a variable transmission ratio; and
   a second transmission element between the second electric motor and said differential;
   wherein the second electric motor is controlled so as to provide an additional power during gear changes of the first transmission element, so as to fully compensate for power loss inherent in the gear change, and wherein the first electric motor and the second electric motor are offset from a longitudinal axis of the axle, the longitudinal axis of the axle being interposed between the first electric motor and the second electric motor.

2. The axle according to claim 1, wherein said additional power is approximately equal to the power that was provided by the first electric motor just before the gear change.

3. The axle according to claim 1, wherein the second electric motor is controlled so as to provide an over-torque during gear changes of the first transmission element, said over-torque being approximately equal to the torque provided by the first electric motor just before the gear change.

4. The axle according to claim 1, wherein the electric current supplied to the second electric motor is increased during gear changes so as to provide an over-torque during gear changes of the first transmission element.

5. The axle according to claim 1, wherein the second transmission element has a fixed transmission ratio.

6. The axle according to claim 1, wherein the two transmission elements have different transmission ratios.

7. The axle according to claim 1, wherein the first transmission element has two transmission ratios.

8. The axle according to claim 7, wherein the second transmission element has a transmission ratio which is between the first transmission ratio and the second transmission ratio of the first transmission element.

9. The axle according to claim 1, wherein the first electric motor and the second electric motor are arranged inside of an axle housing.

10. The axle according to claim 1, wherein the transmission ratio of the first transmission element is automatically modified according to the speed of the vehicle.

11. The axle according to claim 1, wherein the axis of rotation of each electric motor is parallel to a longitudinal axis of the axle.

12. A vehicle comprising an axle according to claim 1.

13. The vehicle according to claim 12, wherein each powertrain of the vehicle is of the electric type.

\* \* \* \* \*